US009349349B2

(12) United States Patent
Motokura et al.

(10) Patent No.: US 9,349,349 B2
(45) Date of Patent: May 24, 2016

(54) COMPUTER READABLE MEDIUM HAVING PROGRAM RECORDED THEREIN, INFORMATION PROCESSING APPARATUS, INFORMATION PROCESSING METHOD, AND INFORMATION PROCESSING SYSTEM

(71) Applicant: NINTENDO CO., LTD., Kyoto-shi, Kyoto (JP)

(72) Inventors: Kenta Motokura, Kyoto (JP); Koichi Hayashida, Kyoto (JP); Yusuke Kitazono, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 104 days.

(21) Appl. No.: 14/074,740

(22) Filed: Nov. 8, 2013

(65) Prior Publication Data

US 2014/0292640 A1   Oct. 2, 2014

(30) Foreign Application Priority Data

Mar. 29, 2013 (JP) ................................. 2013-073201

(51) Int. Cl.
*G09G 5/00* (2006.01)
*G09G 5/36* (2006.01)
*A63F 13/00* (2014.01)
*A63F 13/40* (2014.01)
*A63F 13/30* (2014.01)

(52) U.S. Cl.
CPC ................ *G09G 5/363* (2013.01); *A63F 13/00* (2013.01); *A63F 13/10* (2013.01); *A63F 13/12* (2013.01); *A63F 2300/10* (2013.01); *A63F 2300/6045* (2013.01); *A63F 2300/634* (2013.01); *A63F 2300/807* (2013.01)

(58) Field of Classification Search
USPC ......... 345/156, 427, 473, 474, 420, 589, 158, 345/419; 463/32, 33, 30
See application file for complete search history.

(56) References Cited

U.S. PATENT DOCUMENTS

| | | | | |
|---|---|---|---|---|
| 6,226,008 | B1* | 5/2001 | Watanabe et al. | 345/427 |
| 7,101,283 | B2* | 9/2006 | Okamoto et al. | 463/30 |
| 7,126,607 | B2* | 10/2006 | Emerson | 345/474 |
| 7,677,977 | B2* | 3/2010 | Maehiro et al. | 463/32 |
| 2002/0068626 | A1* | 6/2002 | Takeda | A63F 13/10 463/30 |
| 2005/0049022 | A1 | 3/2005 | Mullen | |
| 2007/0139419 | A1* | 6/2007 | Azuma | A63F 13/10 345/474 |
| 2007/0167239 | A1* | 7/2007 | O'Rourke | G07F 17/32 463/42 |
| 2007/0200855 | A1* | 8/2007 | Minagawa | 345/474 |
| 2007/0298881 | A1* | 12/2007 | Kawamura | A63F 13/10 463/33 |

(Continued)

FOREIGN PATENT DOCUMENTS

JP    2000-237451    9/2000

*Primary Examiner* — Thuy Pardo
(74) *Attorney, Agent, or Firm* — Nixon & Vanderhye PC

(57) ABSTRACT

An example apparatus, which includes a predetermined input device for outputting operational data indicating operational inputs entered by a player and a display unit that displays predetermined characters in a virtual space, moves a first character in the virtual space based on the operational data, moves a second character in the virtual space based on automatic operating data which is a set of operational data for continuously moving a character, determines whether the first character satisfies a predetermined condition or not, and moves the second character from a state in which the second character satisfies the predetermined condition based on the automatic operating data in response to the first character satisfying the predetermined condition.

28 Claims, 6 Drawing Sheets

(56) References Cited

U.S. PATENT DOCUMENTS

| | | | |
|---|---|---|---|
| 2011/0018868 A1* | 1/2011 | Inoue | A63F 13/10 345/419 |
| 2011/0111851 A1 | 5/2011 | Hayashida et al. | |
| 2011/0316860 A1* | 12/2011 | Mukai | 345/473 |
| 2013/0038623 A1* | 2/2013 | Tezuka et al. | 345/589 |
| 2013/0072300 A1* | 3/2013 | Kishimoto | A63F 13/10 463/32 |
| 2013/0249910 A1* | 9/2013 | Matsumiya | G06T 15/503 345/420 |
| 2014/0184496 A1* | 7/2014 | Gribetz et al. | 345/156 |

* cited by examiner

COMPUTER READABLE MEDIUM HAVING PROGRAM RECORDED THEREIN, INFORMATION PROCESSING APPARATUS, INFORMATION PROCESSING METHOD, AND INFORMATION PROCESSING SYSTEM

CROSS-REFERENCE TO RELATED APPLICATIONS

This application is based upon and claims the benefit of priority of the prior Japanese Patent Application No. JP2013-073201, filed on Mar. 29, 2013, the entire contents of which are incorporated herein by reference.

FIELD

The present disclosure relates to a computer readable medium having a program recorded therein, information processing apparatus, information processing method, and information processing system.

BACKGROUND AND SUMMARY

Systems are known in which a character operated by a user can move on a field or course in a virtual space.

An example of a program according to an embodiment is a program for execution on a computer of an information processing apparatus that comprises a predetermined input device for outputting operational data indicating operational inputs entered by a player and that displays predetermined characters in a virtual space, the program causing the computer to function as: a first character control unit that moves a first character in the virtual space based on the operational data; a second character control unit that moves a second character in the virtual space based on automatic operating data which is a set of operational data for continuously moving a character; and a determination unit that determines whether the first character satisfies a predetermined condition or not, wherein the second character control unit moves the second character from a state in which the second character satisfies the predetermined condition based on the automatic operating data in response to the first character satisfying the predetermined condition.

By moving the second character from a state in which the second character satisfies the predetermined condition based on the automatic operating data in response to the first character displayed in the virtual space satisfying the predetermined condition, the user who is operating the first character in the virtual space can easily perceive the second character again.

The determination unit may determine that the first character satisfies the predetermined condition if the first character has reached a specific position, a specific object, or a specific zone in the virtual space. The second character control unit may move the second character from a state in which the second character satisfies the predetermined condition based on the automatic operating data at a timing at which the first character has satisfied the predetermined condition.

The second character control unit may move the second character from a state in which the second character satisfies the predetermined condition based on the automatic operating data with a delay after the timing at which the first character has satisfied the predetermined condition. The second character control unit may gradually change a state of the second character based on the automatic operating data such that the second character satisfies the predetermined condition within a predetermined period between the timing at which the first character has satisfied the predetermined condition and the timing at which the second character is caused to act from a state in which the second character satisfies the predetermined condition. In the predetermined period, the second character control unit may increase a speed of reproducing the second character and also change the state of the second character such that the second character satisfies the predetermined condition.

The program may cause the computer to function as operation recording control unit that records actions of the first character as the automatic operating data. The program may cause the computer to function as reception unit that receives the automatic operating data over a network. The automatic operating data may include condition data indicating the predetermined condition and timing data that indicates the timing at which the predetermined condition is satisfied. The second character control unit may move a plurality of second characters in the virtual space based on the automatic operating data, and move the plurality of second characters from a state in which the second characters each satisfy the predetermined condition based on the automatic operating data in response to the first character satisfying the predetermined condition. The second character control unit may move the plurality of second characters in the virtual space based on different sets of automatic operating data. The second character control unit may move each of the plurality of second characters from a state in which the second characters each satisfy the predetermined condition based on the automatic operating data with a delay after the timing at which the first character has satisfied the predetermined condition. The second character control unit may move each of the plurality of second characters at different timings from a state in which the second characters each satisfy the predetermined condition. The program may cause the computer to function as a count recording control unit that records a number of times a same predetermined condition is satisfied by the first character, and the second character control unit may move the second character from a state in which the second character satisfies the predetermined condition based on the automatic operating data in accordance with the number of times the same predetermined condition has been satisfied by the first character.

The embodiment can also be construed as an information processing apparatus, a computer-implemented information processing method, or an information processing system. The embodiment may also be practiced as such a program recorded in a recording medium readable by a computer, other devices or machines. A recording medium readable by a computer, other devices or machines refers to a recording medium that stores information such as data and programs by electrical, magnetic, optic, mechanical, or chemical action, and that allows the information to be read by a computer or the like.

According to the present invention, a user operating a character in a virtual space can easily perceive a ghost character again.

DETAILED DESCRIPTION OF NON-LIMITING EXAMPLE EMBODIMENTS

The embodiment will be described with reference to the drawings. The embodiment described below illustrates an example and is not intended to limit the embodiment to the specific configurations described below. For practicing embodiments, a specific configuration may be selected appropriately for each embodiment. For example, the embodiment may be applied to a program for execution on a computer of an information processing apparatus, an information processing apparatus, an information processing system having one or more information processing apparatuses, an information processing method and the like.

<Hardware Configuration>

Figure 1:
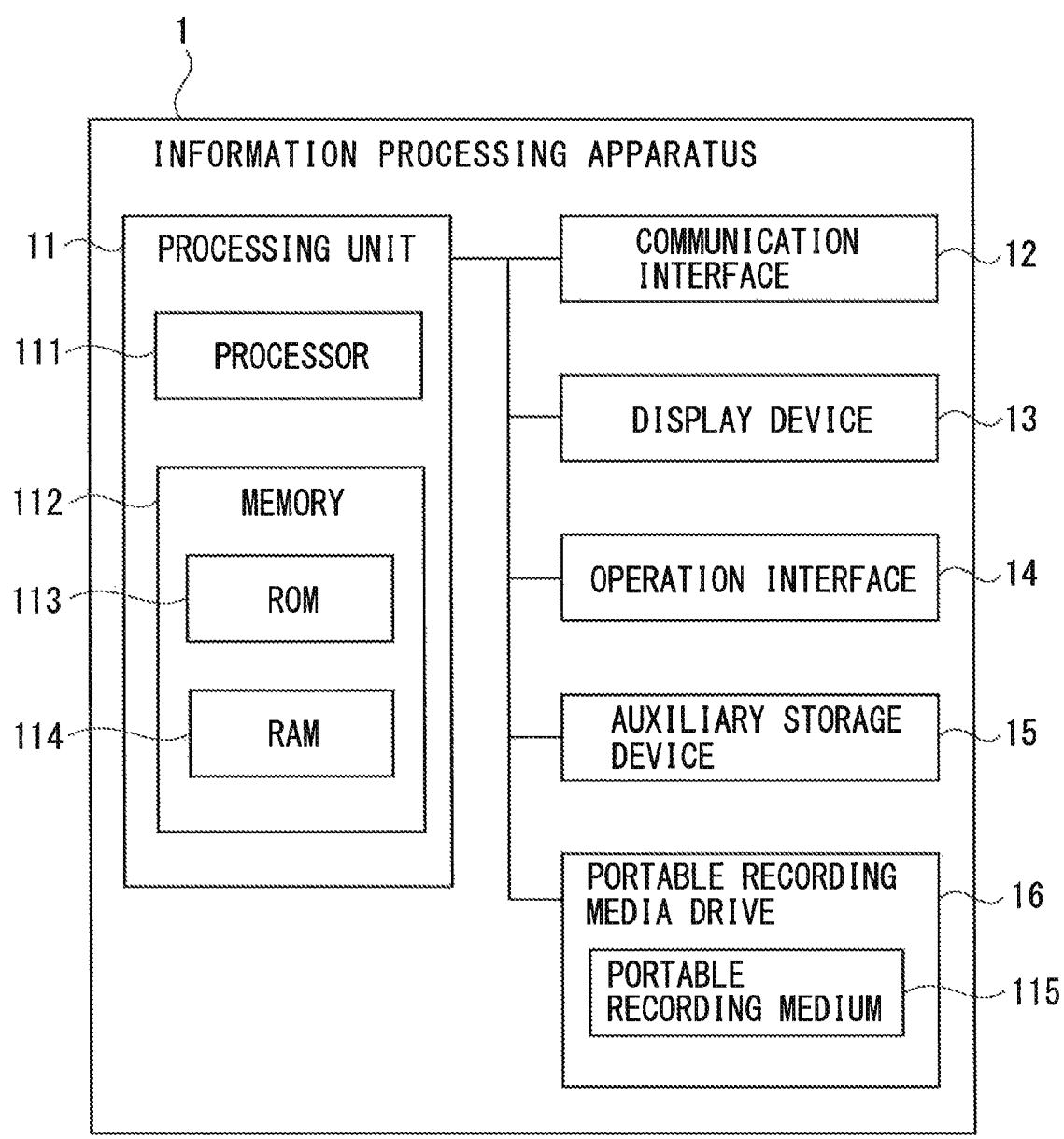
FIG. 1 shows an example non-limiting hardware configuration of an information processing apparatus.

FIG. 1 shows an example non-limiting hardware configuration of an information processing apparatus 1. The information processing apparatus 1 is an electronic device such as a PC (Personal Computer), PDA (Personal Digital Assistant), smart phone, tablet terminal, cellular phone terminal, electronic book, and game console, for example. The information processing apparatus 1 includes a processing unit 11, a communication interface 12, a display device 13, and an operation interface 14. The information processing apparatus 1 may further include an auxiliary storage device 15. The information processing apparatus 1 may further include a portable recording media drive 16. The components are interconnected by buses. Not all the components of the information processing apparatus 1 illustrated in FIG. 1 are requisite; the components of the information processing apparatus 1 may be added or removed as desired for implementing the information processing apparatus 1.

The processing unit 11 includes a processor 111 and a memory 112. The processor 111 may be a CPU (Central Processing Unit), a DSP (Digital Signal Processor), or the like, for example. The processor 111 executes various kinds of processing responsive to a game program, a simulation program, or an application program stored in the memory 112. The memory 112 includes a ROM (Read Only Memory) 113 and a RAM (Random Access Memory) 114. The ROM 113 stores programs and data for controlling the information processing apparatus 1, for example. The RAM 114 temporarily stores a program or data and serves as a working area.

The communication interface 12 is an interface that performs communication (input and output) of information with a server or other apparatuses over a network. The communication interface 12 connects to a wired network and/or a wireless network. The communication interface 12 is a NIC (Network Interface Card), a wireless LAN (Local Area Network) card or the like, for example. Data and the like received by the communication interface 12 is output to the processing unit 11.

The display device 13 may be a CRT (Cathode Ray Tube), liquid crystal display, plasma display, or organic EL (electroluminescence) display, for example. The operation interface 14 is an input device including a keyboard, a pointing device such as a mouse, operation buttons, various sensors including a motion sensor, for example. The operation interface 14 may include an audio input device, such as a microphone. The operation interface 14 outputs operational data indicating operational inputs entered by the user to the processing unit 11. The display device 13 and/or the operation interface 14 may be a touch panel combining display and operating functions. The display device 13 may be a device that is capable of switching between stereoscopic display for displaying a stereoscopic image that can be seen three-dimensionally and planar display for displaying an image two-dimensionally (or displaying a planar view image).

The auxiliary storage device 15 stores multiple programs and data for use by the processing unit 11 in execution of the programs. The auxiliary storage device 15 may store a game program, a simulation program, and an application program. The processor 111 may load the game program, simulation program, application program or the like stored in the auxiliary storage device 15 into the memory 112 and execute various kinds processing. The auxiliary storage device 15 may be an EPROM (Erasable Programmable ROM) or a hard disk drive, for example.

The portable recording media drive 16 drives the portable recording medium 115 and performs data input and output to/from the portable recording medium 115 responsive to signals from the processing unit 11. The portable recording media drive 16 may store game, simulation, and application programs or the like. The processor 111 may load the game, simulation, or application program stored in the portable recording media drive 16 into the memory 112 to execute various kinds of processing. The portable recording medium 115 is a recording medium such as a USB (Universal Serial Bus) flash memory, CD (Compact Disc), and DVD (Digital Versatile Disc), for example.

Figure 2:
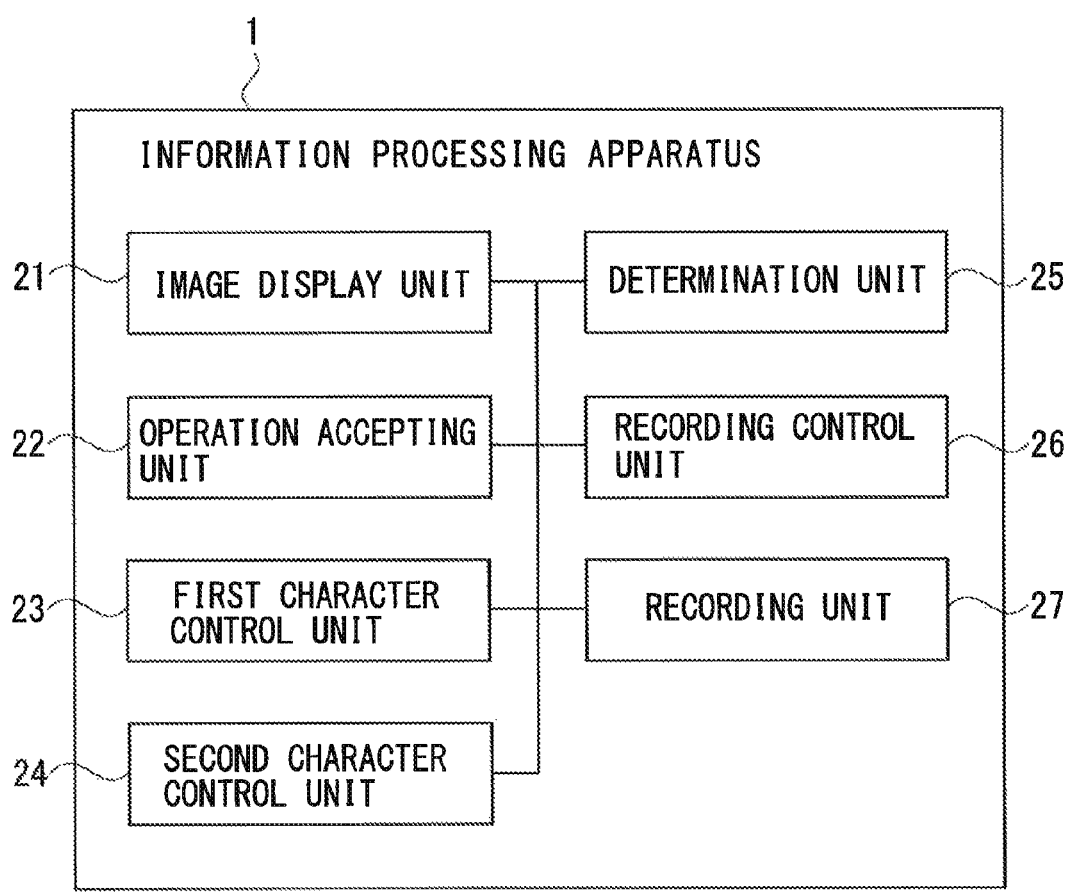
FIG. 2 shows example non-limiting functional blocks of the information processing apparatus.

FIG. 2 shows example non-limiting functional blocks of the information processing apparatus 1. The information processing apparatus 1 functions as an image display unit 21, an operation accepting unit 22, a first character control unit 23, a second character control unit 24, a determination unit 25, a recording control unit 26, and a recording unit 27 illustrated in FIG. 2 through execution of programs by the processing unit 11. That is, the functional units illustrated in FIG. 2 are realized by a computer including the processor 111, memory 112 and other components and programs executed on the computer.

A game program, simulation program and application program and the like are executed by the processor 111. When execution of a game, simulation, or application is started, the image display unit 21 displays an image of a virtual space on the display device 13. The virtual space may be either a two-dimensional or three-dimensional virtual space. In the virtual space, objects representing such as characters, items, icons, and/or backgrounds are displayed.

Characters include playable characters and non-playable characters. A playable character is a character that moves in a virtual space in response to operations by a user (also called a player) via the operation interface 14. The playable character is also called a player object. The playable character is an example of a first character. A non-playable character is a character that moves in a virtual space independently of the user's operation. There are a case where a playable character and a non-playable character interact with each other in a virtual space and a case where they do not interact with each other. More specifically, there are a case where motion of the playable character and/or non-playable character changes when a contact between the playable character and non-playable character occurs in a virtual space and a case where the motion of playable character and the non-playable character does not change.

The operation accepting unit 22 accepts an operation on the playable character displayed in the virtual space via the operation interface 14. The first character control unit 23 controls the motion of the playable character in the virtual space based on operational data output from the operation interface 14. The second character control unit 24 controls the motion of a ghost character in the virtual space based on automatic operating data, which is a set of operational data for continuously moving (running) a character. A ghost character is a non-playable character that acts based on the user's operation histories and represents an example of a second character. The determination unit 25 makes determination such as whether certain processing has been done in the virtual space, whether certain processing has completed. The recording control unit 26 records data on the playable character in the virtual space and/or other data in the recording unit 27.

Figure 3:
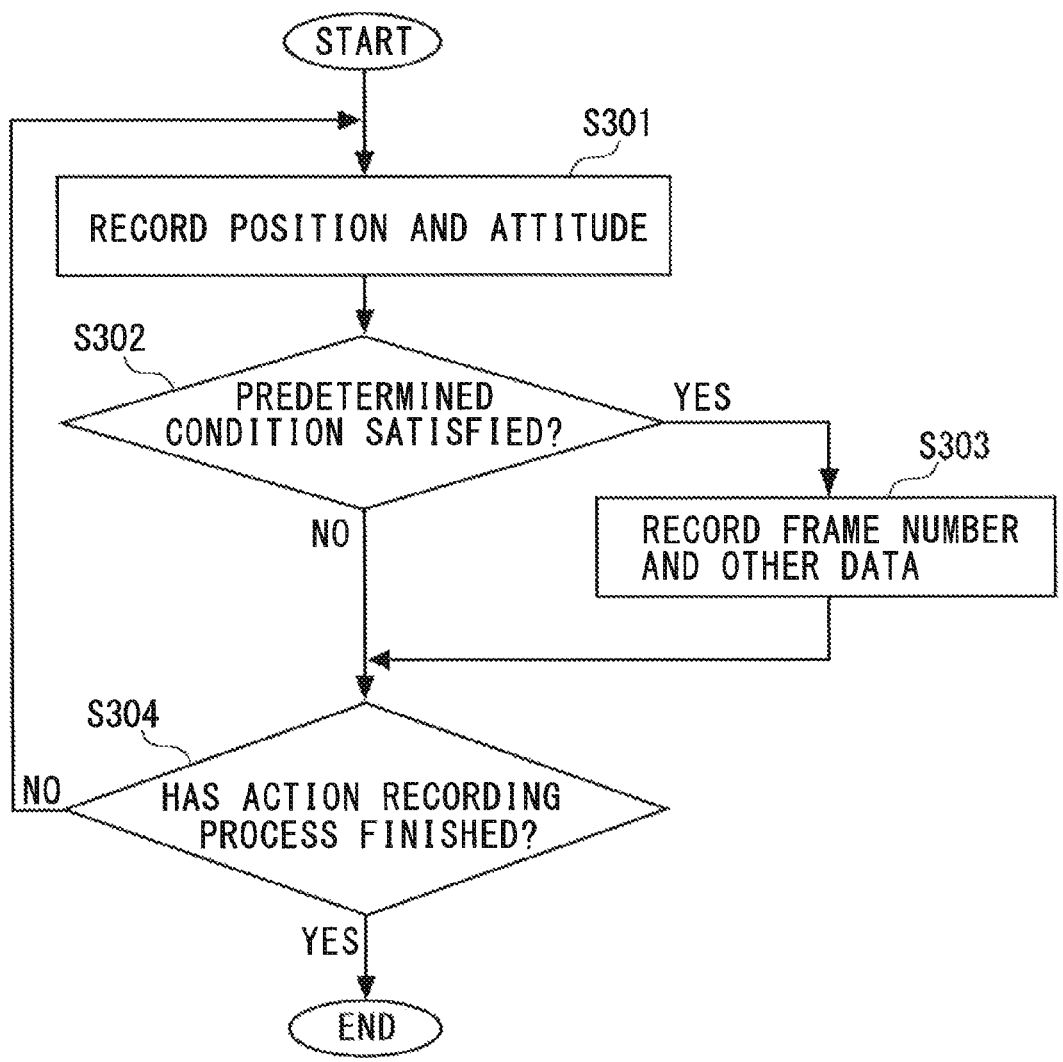
FIG. 3 shows an example non-limiting flowchart illustrating processing performed by a processing unit.

FIG. 3 shows an example non-limiting flowchart illustrating processing performed by the processing unit 11. The flowchart of FIG. 3 illustrates the process of recording actions of a playable character (hereinafter referred to as "action recording process"). The process of the flowchart illustrated in FIG. 3 may start in response to a virtual space image appearing on the display device 13 and the user selecting the start of the action recording process via the operation interface 14. The action recording process may be initiated upon start of a prepared stage in a game, simulation, or an application. The actions of the playable character may be automatically recorded on each round of play. Not all of action data for the playable character may be maintained by saving only the latest data and/or data for an instance where a good score was recorded by execution of a game, simulation, or application. In the virtual space, the playable character and other objects are displayed. The process from S301 to S304 in FIG. 3 are performed per frame (e.g., at the interval of 1/60 seconds).

At S301, the recording control unit 26 records data on positions and attitudes of the playable character and frame numbers in association with each other in the recording unit 27. The position of the playable character is the position (coordinates) at which the playable character is present in the virtual space. The attitude of the playable character is the direction in which the playable character points in the virtual space (i.e., the orientation of the playable character). The recording control unit 26 may record key input data output from the operation interface 14 and frame numbers in association with each other in the recording unit 27. The recording control unit 26 may also record data on the positions, attitudes, and actions of the playable character in the recording unit 27 in association with frame numbers. The actions of the playable character include jumping of the playable character in the virtual space, entry of the playable character into a certain entrance or an area, and other predetermined movements, for example.

At S302, the determination unit 25 determines whether the playable character satisfies a predetermined condition. The determination unit 25 may determine whether the playable character satisfies a predetermined condition according to whether the playable character has reached a specific position, a specific object, or a specific zone. That is, the determination unit 25 may determine that the playable character satisfies a predetermined condition when the playable character has reached a specific position, a specific object, or a specific zone. The determination unit 25 may also determine whether the playable character satisfies a predetermined condition according to whether the playable character has passed through a specific position, a specific object, or a specific zone. The determination unit 25 may also determine whether the playable character satisfies a predetermined condition according to whether switching to a different situation (or scene) has occurred. The determination unit 25 may also determine whether the playable character satisfies a predetermined condition according to whether the playable character has turned into a predetermined state (or status). Examples of the predetermined state may be that the playable character has acquired a specific item, that the playable character has lost a specific item, or that the appearance of the playable character has changed. The determination unit 25 may also determine whether the playable character satisfies two or more predetermined conditions.

The specific position is a position (coordinates) defined in a virtual space. The specific position is assigned an identification number (ID number). Two or more specific positions may be defined in the virtual space. The specific object is an object representing a particular background in the virtual space. Two or more specific objects may be placed in the virtual space. The specific object is assigned an identification number. The specific object may be an object with which the playable character can perform a specific action. For example, when the playable character has reached the specific object, it may cause a change to a different situation (or scene). Alternatively, when the playable character has reached the specific object, the playable character may be caused to move to a remote position within the same situation, for example. The specific zone is a zone defined in a virtual space. Two or more specific zones may be defined in the virtual space. The specific zone is assigned an identification number. The specific position, specific object and specific zone may be a position and a zone that enables the user to realize that the playable character has reached them.

If the playable character satisfies the predetermined condition (S302: YES), the flow proceeds to step S303. If the playable character does not satisfy the predetermined condition (S302: NO), the flow proceeds to step S304.

At S303, the recording control unit 26 records frame numbers at which the playable character reached a specific position, a specific object, and a specific zone, and the specific position, object, and zone that the playable character reached in the recording unit 27. The frame number at which the playable character reached a specific position, object, or zone is an example of timing data indicating the timing at which a predetermined condition is satisfied. The identification numbers of the specific position, object, and zone that the playable character reached are an example of condition data indicating a predetermined condition. The recording control unit 26 records the number of times the same predetermined condition is satisfied by the playable character in the recording unit 27. The recording control unit 26 may record the number of times the playable character reached the same specific position, the same specific object, and the same specific zone in the recording unit 27 as the number of times the same predetermined conditions are satisfied by the playable character. After the processing at S303, the flow proceeds to S304. For example, the determination unit 25 may determine that the action recording process has finished when a prepared stage in a game, simulation, or an application has ended.

At S304, the determination unit 25 determines whether the action recording process has finished. For example, the determination unit 25 may determine that the action recording process has finished if execution of a game program, simulation program, or application program has ended. The determination unit 25 may determine that the action recording process has finished when the user selects to end the action recording process via the operation interface 14, for example. For example, the determination unit 25 may determine that the action recording process has finished when a prepared stage in a game, simulation, or an application has ended.

If the action recording process has finished (S304: YES), the process of the flowchart illustrated in FIG. 3 ends. If the action recording process has not finished (S304: NO), the flow proceeds to S301.

Figure 4:
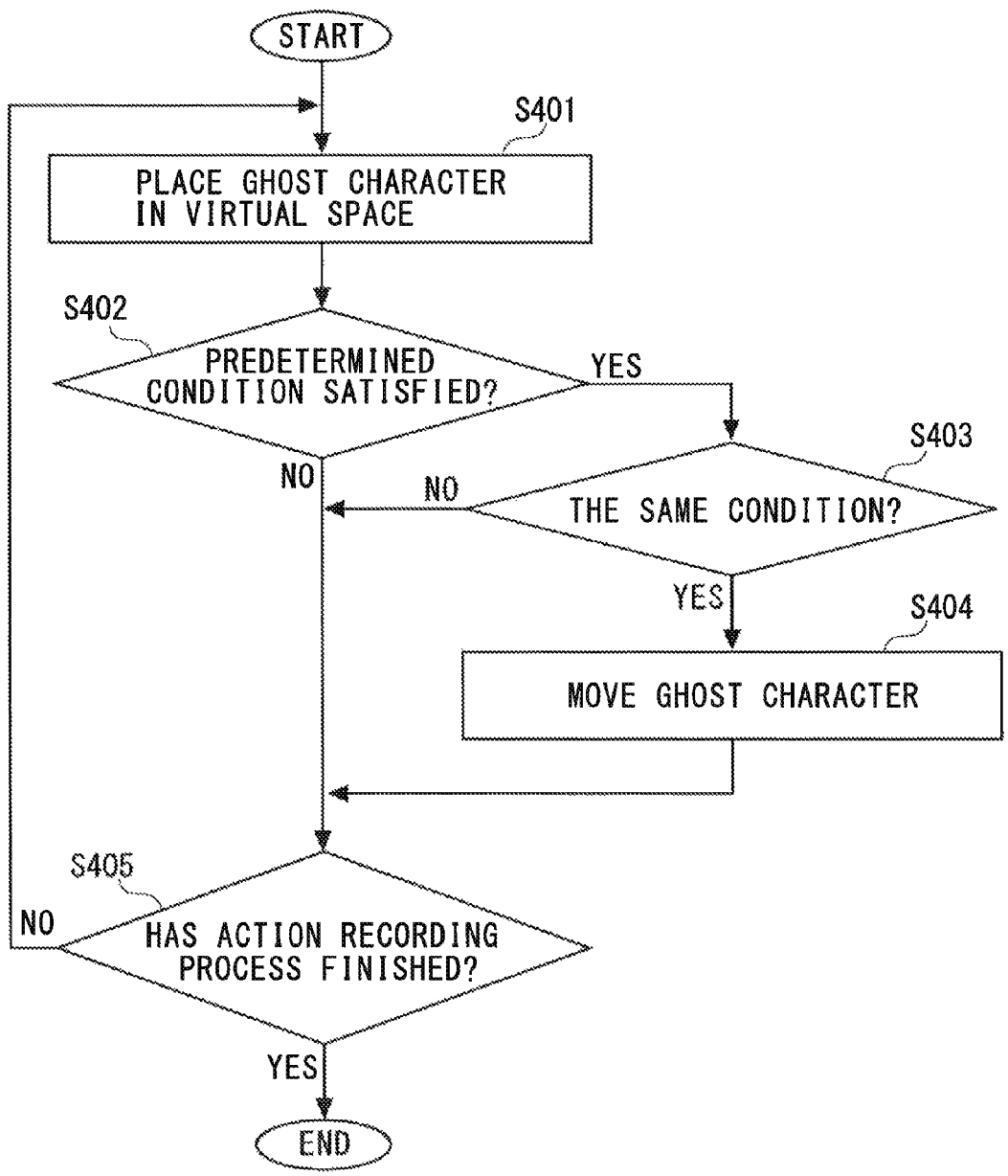
FIG. 4 shows an example non-limiting flowchart illustrating processing performed by the processing unit.

FIG. 4 shows an example non-limiting flowchart illustrating a process performed by the processing unit 11. The process of the flowchart illustrated in FIG. 4 is the process for reproducing (displaying) the actions of a ghost character (hereinafter referred to as "action reproducing process"). The process of the flowchart illustrated in FIG. 4 may start in response to a virtual space image appearing on the display device 13 and the user selecting the start of the action reproducing process via the operation interface 14. The action reproducing process may be initiated upon start of a prepared stage in a game, simulation, or an application. In the virtual space, the playable character and other objects are displayed.

At S401, the image display unit 21 places a ghost character in a virtual space. A ghost character is a character that does not interact with the playable character in the virtual space. The ghost character may be a character having a different appearance from the playable character or a translucent version of the playable character. The image display unit 21 may also place two or more ghost characters in the virtual space. Such ghost characters may have the same appearance or different appearances.

The second character control unit 24 controls the action of the ghost character based on data on the positions and attitudes of the playable character and frame numbers recorded in the action recording process. Thus, the ghost character is reproduced in the virtual space based on the data on the positions and attitudes of the playable character and frame numbers recorded in the action recording process. Hereinbelow, a playable character recorded in an action recording process may also be called "recorded character", and a frame number recorded in an action recording process may also be called "recorded frame number". Data on positions and attitudes of a recorded character and recorded frame numbers are a set of operational data for continuously moving a ghost character. The set of operational data for continuously moving a ghost character is an example of automatic operating data. The second character control unit 24 may control the actions of multiple ghost characters based on the same automatic operating data or different sets of automatic operating data. When key input data and frame numbers are recorded in an action recording process, the second character control unit 24 may control the action of the ghost character based on the key input data and frame numbers. Key input data and frame numbers are a set of operational data for continuously moving a ghost character. When data on the positions, attitudes and actions of the playable character and frame numbers are recorded in an action recording process, the second character control unit 24 may control the actions of a ghost character based on the data on the positions, attitudes and actions of the recorded character and the frame numbers.

At S402, the determination unit 25 determines whether the playable character satisfies a predetermined condition. The determination unit 25 may determine whether the playable character satisfies a predetermined condition according to whether the playable character has reached a specific position, a specific object, or a specific zone. That is, the determination unit 25 may determine that the playable character satisfies a predetermined condition when the playable character has reached a specific position, a specific object, or a specific zone. The determination unit may also determine whether the playable character satisfies the predetermined condition according to whether the playable character has passed through a specific position, a specific object, or a specific zone. The determination unit 25 may also determine whether the playable character satisfies the predetermined condition according to whether switching to a different situation (or scene) has occurred. The determination unit 25 may also determine whether the playable character satisfies the predetermined condition according to whether the playable character has turned into a predetermined state (or status). The determination unit 25 may also determine whether the playable character satisfies two or more predetermined conditions. The specific position for the action reproducing process is set at the same location as the specific position for the action recording process. The specific object for the action reproducing process is the same object as the specific object for the action recording process. The specific zone for the action reproducing process is set to the same zone as the specific zone for the action recording process. The processing at S402 is performed per frame.

If the playable character satisfies the predetermined condition (S402: YES), the flow proceeds to S403. If the playable character does not satisfy the predetermined condition (S402: NO), the flow proceeds to S405.

At S403, the determination unit 25 determines whether the predetermined condition satisfied by the playable character agrees with the predetermined condition satisfied by the recorded character. The processing at S403 is performed per frame.

If the predetermined condition satisfied by the playable character agrees with the predetermined condition satisfied by the recorded character (S403: YES), the flow proceeds to S404. If the predetermined condition satisfied by the playable character does not agree with the predetermined condition satisfied by the recorded character (S403: NO), the flow proceeds to S405.

At S404, the second character control unit 24 moves the ghost character from a state in which the ghost character satisfies the predetermined condition. For example, the second character control unit 24 moves the ghost character from the position and attitude that are associated with the recorded frame number at which the recorded character satisfied the predetermined condition based on automatic operating data. In this case, the second character control unit 24 changes the recorded frame number it references for moving the ghost character to the recorded frame number at which the recorded character satisfied the predetermined condition. The second character control unit 24 restarts control of the actions of the ghost character from the changed recorded frame number. If the playable character has reached a specific position, the second character control unit 24 may move the ghost character from the specific position. If the playable character has reached a specific object, the second character control unit 24 may move the ghost character from the position at which the specific object is placed. If the playable character has reached a specific zone, the second character control unit 24 may move the ghost character from the position at which the recorded character reached the specific zone. When the ghost character starts to act from a state in which it satisfies a predetermined condition, the ghost character may overlap the playable character. Since the ghost character is a character that does not interact with the playable character, it does not affect the action of the playable character. If the playable character and the ghost character overlap, the playable character may be displayed in its entirety and part or the whole of the ghost character may be hidden. The second character control unit 24 may also move multiple ghost characters from a state in which they satisfy a predetermined condition. In the following description, "ghost character" may be taken as plural even where it is not specified that there is a plurality of them.

The second character control unit 24 may move a ghost character from a state in which the ghost character satisfies a predetermined condition at the frame in which the playable character satisfied the predetermined condition. It follows that the timing (point in time) at which the playable character satisfied a predetermined condition substantially coincides with the timing (point in time) at which the ghost character starts action while satisfying the predetermined condition. The second character control unit 24 may also move ghost character in a state in which the ghost character satisfies a predetermined condition in a predetermined number of frames after the frame at which the playable character satisfied the predetermined condition. That is, the second character control unit 24 may move the ghost character from a state in which the ghost character satisfies the predetermined condition after elapse of a predetermined time period after when the playable character satisfied the predetermined condition. Accordingly, the timing at which the ghost character starts its action from a state in which it satisfies the predetermined condition is later than the timing at which the playable character satisfies the predetermined condition.

Figure 5A:
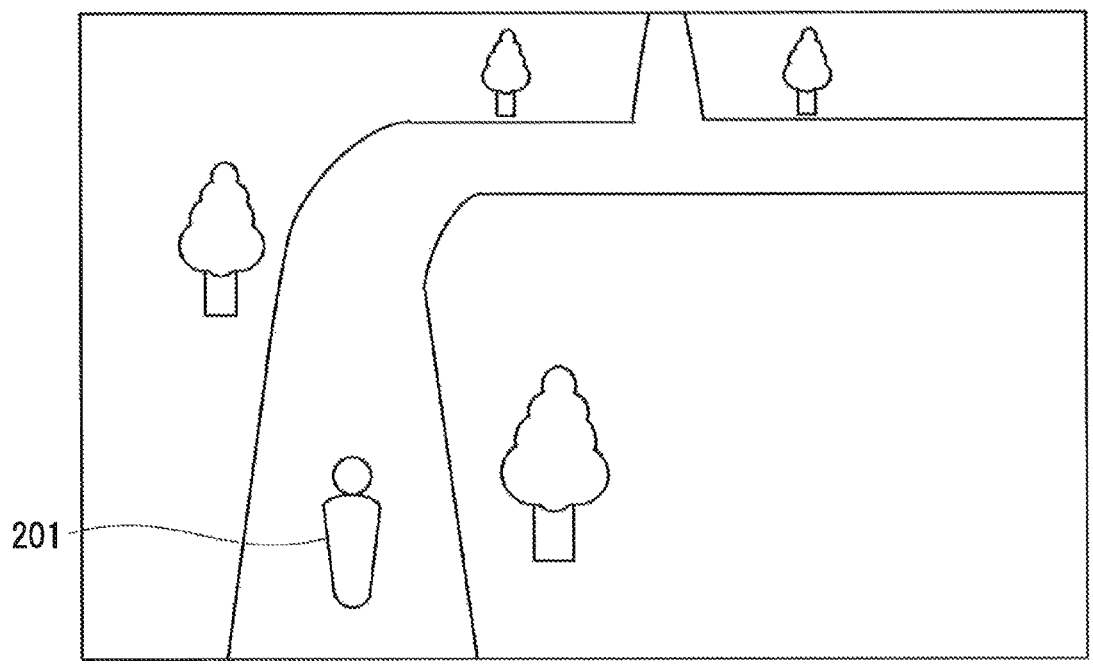
FIG. 5A shows an example non-limiting virtual space.
Figure 5B:
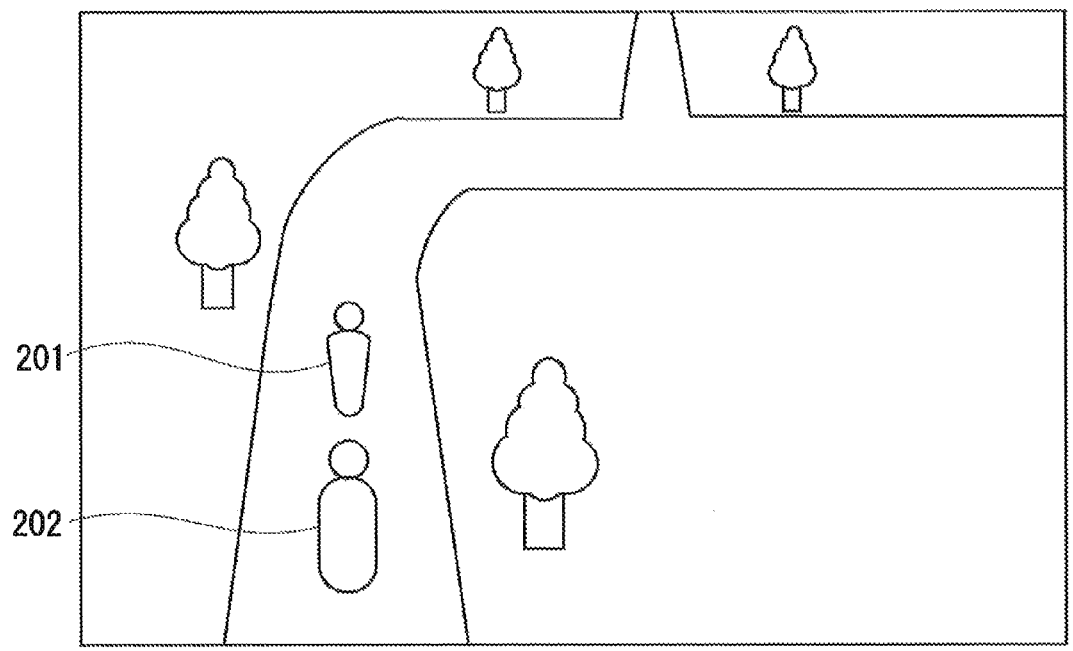
FIG. 5B shows an example non-limiting virtual space.

FIGS. 5A and 5B show an example non-limiting virtual space for a case where the timing at which the ghost character starts its action from a state in which it has satisfied a predetermined condition is later than the timing at which the playable character satisfied the predetermined condition. Reference numeral 201 in FIGS. 5A and 5B denotes the playable character and reference numeral 202 in FIG. 5B denotes the ghost character. FIG. 5A represents a state in which the playable character 201 has reached a predetermined position. In other words, FIG. 5A illustrates the state of the playable character 201 when the playable character 201 satisfies a predetermined condition. In FIG. 5B, the playable character 201 has moved from the predetermined position and the ghost character 202 starts its action from a state in which the ghost character 202 satisfies the predetermined condition with a delay after when the playable character 201 satisfied the predetermined condition.

The second character control unit 24 may change the state of the ghost character so that it satisfies a predetermined condition within a certain period between the timing (point in time) at which the playable character satisfies the predetermined condition and the timing (point in time) at which the ghost character is caused to move from a state in which it satisfies the predetermined condition. The second character control unit 24 may also change the state of the ghost character based on automatic operating data. For example, the second character control unit 24 may make the ghost character approach a specific position, object or zone while alternately displaying and hiding the ghost character in the virtual space so that the ghost character satisfies a predetermined condition.

The second character control unit 24 may control the action of the ghost character by increasing or decreasing the recorded frame number by one relative to a frame. The second character control unit 24 may control the action of the ghost character by increasing or decreasing the recorded frame number by two or greater relative to a frame. The reproduction speed for a ghost character that is reproduced by increasing or decreasing the recorded frame number by two or greater relative to a frame is higher than the reproduction speed of a ghost character that is reproduced by increasing or decreasing the recorded frame number by one relative to a frame. The second character control unit 24 may increase the reproduction speed of the ghost character and also change the state of the ghost character so that it is in a predetermined state within the prescribed period mentioned above. For example, the second character control unit 24 may increase the reproduction speed of the ghost character in the period so that the ghost character approaches a specific position, object or zone and also change the state of the ghost character so that it satisfies a predetermined condition. When the recorded frame number referenced for moving the ghost character is smaller than the recorded frame number at which the recorded character satisfied a predetermined condition, the second character control unit 24 may fast forward the reproduction of the ghost character so that the ghost character approaches a specific position, object or zone. When the recorded frame number referenced for moving the ghost character is greater than the recorded frame number at which the recorded character satisfied a predetermined condition, the second character control unit 24 may reverse the reproduction of the ghost character so that the ghost character approaches a specific position, object or zone.

When multiple ghost characters start to act from a state in which they satisfy predetermined conditions, the second character control unit 24 may start to move the ghost characters at different timings. That is, the second character control unit 24 may start to move the ghost characters at different timings from a state in which the ghost characters satisfy predetermined conditions. By way of example, the second character control unit 24 may move ghost character A from a state in which ghost character A satisfies a predetermined condition in a frame at which the playable character satisfied the predetermined condition, and move ghost character B from a state in which ghost character B satisfies a predetermined condition in 60 frames after the frame in which the playable character satisfied the predetermined condition. When multiple ghost characters start to act from a state in which the ghost characters satisfy predetermined conditions, the second character control unit 24 may move the ghost characters at separated positions. For example, the second character control unit 24 may move multiple ghost characters from positions near a specific position, object or zone.

After the processing at S404, the flow proceeds to S405. At S405, the determination unit 25 determines whether the action reproducing process has finished. For example, the determination unit 25 may determine that the action reproducing process has finished when execution of a game, simulation, or application program has ended. For example, when the user selects to end the action reproducing process via the operation interface 14, the determination unit 25 may determine that the action reproducing process has finished. When end of the action reproducing process is selected, the ghost character ceases to be not displayed in the virtual space. For example, when a prepared stage has ended in a game, simulation or an application, the determination unit 25 may determine that the action reproducing process has finished. For example, when reproduction of actions of a ghost character has ended in a prepared stage in a game, simulation or an application, the determination unit 25 may determine that the action reproducing process has finished. If reproduction of actions of a ghost character ends before a prepared stage ends in a game, simulation or an application, the second character control unit 24 may freeze the ghost character as it was when its reproduction ended or stop displaying the ghost character.

If the action reproducing process has finished (S405: YES), the process of the flowchart illustrated in FIG. 4 ends. If the action reproducing process has not finished (S405: NO), the flow proceeds to S401.

According to this embodiment, a ghost character starts to act from a state in which it satisfies a predetermined condition in response to a playable character satisfying the predetermined condition in an action reproducing process. Thus, even if the user has lost track of the ghost character, the user can recognize the presence of the ghost character again owing to the action of the ghost character from a state in which it satisfies a predetermined condition.

By way of example, it is possible that during an action reproducing process, the ghost character is not being displayed in the virtual space image displayed on the display device 13 and the user loses track of the ghost character. The ghost character starts to act from a state in which it satisfies a predetermined condition in response to the playable character satisfying the predetermined condition, thereby the ghost character is reproduced (displayed) in the virtual space image displayed on the display device 13. The user thus can easily perceive the ghost character again.

It is possible that in an action reproducing process the playable character satisfies the same predetermine condition two or more times. The second character control unit 24 may move a ghost character from a state in which ghost character satisfies a predetermined condition in accordance with the number of times the playable character has satisfied the same predetermined condition based on automatic operating data. When the playable character has satisfied the same predetermined condition once in an action reproducing process, the second character control unit 24 may move the ghost character from the position and attitude associated with the recorded frame number at which the recorded character satisfied the same predetermined condition once. When the playable character has satisfied the same predetermined condition twice in an action reproducing process, the second character control unit 24 may move the ghost character from the position and attitude associated with the recorded frame number at which the recorded character satisfied the same predetermined condition for the second time. When the playable character has satisfied the same predetermined condition two or more times in an action reproducing process, the second character control unit 24 may move the ghost character from the position and attitude associated with the recorded frame number at which the recorded character satisfied the same predetermined condition for the first time. When the playable character has satisfied the same predetermined condition two or more times in an action reproducing process, the second character control unit 24 may move the ghost character from the position and attitude associated with the recorded frame number at which the recorded character last satisfied the same predetermined condition.

The user operating the playable character (recorded character) in an action recording process may be the same as or different from the user operating the playable character in an action reproducing process. For example, if user A operates the playable character in the action reproducing process, the ghost character may be reproduced (displayed) in the virtual space based on automatic operating data for the playable character (recorded character) recorded by user A. For example, if user A operates the playable character in the action reproducing process, the ghost character may be reproduced (displayed) in the virtual space based on automatic operating data for the playable character (recorded character) recorded by user B.

A user may operate the playable character using different accounts in an action recording process and an action reproducing process. For example, if user A who is signed up with account A operates the playable character in an action reproducing process, the ghost character may be reproduced (displayed) in the virtual space based on automatic operating data for the playable character (recorded character) recorded by user A who is signed up with account A. For example, if user A who is signed up with account A operates the playable character in an action reproducing process, the ghost character may be reproduced (displayed) in the virtual space based on automatic operating data for the playable character (recorded character) recorded by user A who is signed up with account B.

Automatic operating data may be received by the communication interface 12 from another apparatus connected with the information processing apparatus 1 over a network. The automatic operating data received from the other apparatus is recorded in the recording unit 27. Automatic operating data may also be recorded in the recording unit 27 in advance. That is, a ghost character may be reproduced (displayed) in a virtual space based on the automatic operating data prestored in the recording unit 27 in an action reproducing process without performing action recording process. A ghost character may be a non-playable character serving as an example for the user's operation.

<Computer-Readable Storage Medium>

It is possible to record a program which causes a computer to implement any of the functions described above on a computer readable recording medium. By causing the computer to read in the program from the recording medium and execute it, the function thereof can be provided. The computer readable recording medium mentioned herein indicates a recording medium which stores information such as data and a program by an electric, magnetic, optical, mechanical, or chemical operation and allows the stored information to be read from the computer. Of such recording media, those detachable from the computer include, e.g., a flexible disk, a magneto-optical disk, a CD-ROM, a CD-R/W, a DVD, a DAT, an 8-mm tape, and a memory card. Of such recording media, those fixed to the computer include a hard disk and a ROM.

While the embodiment has been described above in detail, the above description merely exemplifies the embodiment in all aspects and is not intended to limit the scope of the embodiment. It is needless to say that various changes and modifications may be made in the embodiment without departing from the scope thereof. It will be appreciated that the persons skilled in the art can practice equivalents based on technical knowledge from the descriptions of the specific embodiment. Furthermore, it is understood that, unless otherwise specified, terms used in the present specification are used in the meanings usually used in the art. Therefore, unless otherwise defined, all technical and scientific terms used in the present specification have the same meaning as commonly understood by one of ordinary skill in the art to which this embodiment belongs. In case of conflict, the present specification (including definitions) will control.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A non-transitory computer readable medium having recorded therein a program for execution on a computer of an information processing apparatus that comprises an input device for outputting operational data indicating operational inputs entered by a player and that displays characters in a virtual space, the program, when executed, causing the computer to at least:

move a first character in the virtual space based on the operational data received from the input device;

move a second character independently of the first character in the virtual space based on automatic operating data which is data for moving the second character in the virtual space in accordance with a timing, the automatic operating data including position and attitude for the second character in the virtual space or player entered key input data;

determine whether the first character satisfies a predetermined condition out of a plurality of different predetermined conditions;

determine whether the second character satisfies the predetermined condition out of a plurality of different predetermined conditions; and when, based on the determinations of whether the first and second characters satisfy the predetermined condition, the second character satisfies the predetermined condition while the first character satisfies the predetermined condition, move the second character, based on the automatic operating data, such that the second character is moved from a state in which the second character satisfies the predetermined condition.

2. The non-transitory computer readable medium having the program recorded therein according to claim 1, wherein it is determined that the first character satisfies the predetermined condition out of the plurality of different predetermined conditions if the first character has reached a specific position, a specific object, or a specific zone in the virtual space.

3. The non-transitory computer readable medium having the program recorded therein according to claim 1, wherein the second character is moved from a state in which the second character satisfies the predetermined condition satisfied by the first character based on the automatic operating data at a timing at which the first character has satisfied the predetermined condition.

4. The non-transitory computer readable medium having the program recorded therein according to claim 1, wherein the second character is moved from a state in which the second character satisfies the predetermined condition satisfied by the first character based on the automatic operating data with a delay after the timing at which the first character has satisfied the predetermined condition.

5. The non-transitory computer readable medium having the program recorded therein according to claim 4, wherein a state of the second character is gradually changed based on the automatic operating data such that the second character satisfies the predetermined condition satisfied by the first character, within a predetermined period between the timing at which the first character has satisfied the predetermined condition and the timing at which the second character is caused to act from a state in which the second character satisfies the predetermined condition satisfied by the first character.

6. The non-transitory computer readable medium having the program recorded therein according to claim 5, wherein, in the predetermined period, a speed of reproducing the second character is increased and also changes the state of the second character such that the second character satisfies the predetermined condition satisfied by the first character.

7. The non-transitory computer readable medium having the program recorded therein according to claim 1, wherein the program further causes the computer to record actions of the first character, controlled based on the operational data received from the input device, as the automatic operating data.

8. The non-transitory computer readable medium having the program recorded therein according to claim 1, wherein the program further causes the computer to receiving the automatic operating data over a network.

9. The non-transitory computer readable medium having the program recorded therein according to claim 1, wherein the automatic operating data includes condition data indicating the predetermined conditions and timing data that indicates the timing at which the predetermined conditions are satisfied by the second character.

10. The non-transitory computer readable medium having the program recorded therein according to claim 1, wherein a plurality of second characters are moved in the virtual space based on the automatic operating data, and each of the plurality of second characters is moved from a state in which the second characters each satisfy the predetermined condition satisfied by the first character based on the automatic operating data in response to the first character satisfying the predetermined condition.

11. The non-transitory computer readable medium having the program recorded therein according to claim 10, wherein the plurality of second characters are moved in the virtual space based on different sets of automatic operating data.

12. The non-transitory computer readable medium having the program recorded therein according to claim 10, wherein each of the plurality of second characters is moved from a state in which the second characters each satisfy the predetermined condition satisfied by the first character based on the automatic operating data with a delay after the timing at which the first character has satisfied the predetermined condition.

13. The non-transitory computer readable medium having the program recorded therein according to claim 12, wherein each of the plurality of second characters is moved at different timings from a state in which the second characters each satisfy the predetermined condition satisfied by the first character.

14. The non-transitory computer readable medium having the program recorded therein according to claim 1,
wherein the program further causes the computer to record a number of times a same predetermined condition is satisfied by the first character, and
wherein the second character is moved from a state in which the second character satisfies the predetermined condition satisfied by the first character based on the automatic operating data in accordance with the number of times the same predetermined condition has been satisfied by the first character.

15. The non-transitory computer readable medium having the program recorded therein according to claim 1, wherein the second character is a ghost character of the first character and does not interact with the first character in the virtual space.

16. The non-transitory computer readable medium having the program recorded therein according to claim 1, wherein when the second character satisfies the predetermined condition while the first character satisfies the predetermined condition, the speed for moving the second character in accordance with the timing in the automatic operating data is increased to move the second character from a state in which the second character satisfies the predetermined condition satisfied by the first character.

17. The non-transitory computer readable medium having the program recorded therein according to claim 1, wherein the player entered key input data includes operational data received from the input device to control movement of a character in a virtual space during an action recording process, and the second character is moved in the virtual space using the player entered key input data included in the automatic operating data.

18. The non-transitory computer readable medium having the program recorded therein according to claim 1, wherein the program further causes the computer to, during an action recording process: control movement of a player character in the virtual space based on the operational data received from the input device, and record, as the automatic operating data, the player entered key input data which include operational data received from the input device while controlling the movement of the player character.

19. An information processing apparatus comprising:
an input device for outputting operational data indicating operational inputs entered by a player;
a display that displays characters in a virtual space; and
a processing system, comprising at least one processor, the processing system being at least configured to:
move a first character in the virtual space based on the operational data received from the input device;
move a second character independently of the first character in the virtual space based on automatic operating data which is data for moving the second character in the virtual space in accordance with a timing, the automatic operating data including position and attitude for the second character in the virtual space or player entered key input data; and
determine whether the first character satisfies a predetermined condition out of a plurality of different predetermined conditions;
determine whether the second character satisfies the predetermined condition out of a plurality of different predetermined conditions; and
when, based on the determinations of whether the first and second characters satisfy the predetermined condition, the second character satisfies the predetermined condition while the first character satisfies the predetermined condition, move the second character, based on the automatic operating data, such that the second character is moved from a state in which the second character satisfies the predetermined condition.

20. The information processing apparatus of claim 19, wherein the processing system is further configured to:
when the second character and the first character are both determined to satisfy the predetermined condition in a same frame displayed on the display, the second character is moved from the state in which the second character satisfies the predetermined condition to a state in which the second character does not satisfy the predetermined condition based on the automatic operating data.

21. The information processing apparatus of claim 20, wherein the second character is moved from the state in which the second character satisfies the predetermined condition to a state in which the second character does not satisfy the predetermined condition in a predetermined number of frames after a frame in which the first character satisfies the predetermined condition.

22. The information processing apparatus of claim 19, wherein the movement of the second character based on the automatic operating data does not affect the movement of the first character moved based on the operational data received from the input device.

23. The information processing apparatus according to claim 19, wherein the second character is a ghost character of the first character and does not interact with the first character in the virtual space.

24. The information processing apparatus according to claim 19, wherein when the second character satisfies the predetermined condition while the first character satisfies the predetermined condition, the speed for moving the second character in accordance with the timing in the automatic operating data is increased to move the second character from a state in which the second character satisfies the predetermined condition satisfied by the first character.

25. The information processing apparatus according to claim 19, wherein the player entered key input data includes operational data received from the input device to control movement of a character in a virtual space during an action recording process, and the second character is moved in the virtual space using the player entered key input data included in the automatic operating data.

26. The information processing apparatus according to claim 19, wherein the processing system is further configured to, during an action recording process: control movement of a player character in the virtual space based on the operational data received from the input device, and record, as the automatic operating data, the player entered key input data which include operational data received from the input device while controlling the movement of the player character.

27. An information processing method to be carried out by a computer of an information processing apparatus that comprises an input device for outputting operational data indicating operational inputs entered by a player and that displays characters in a virtual space, the method comprising:
moving a first character in the virtual space based on the operational data received from the input device;
moving a second character independently of the first character in the virtual space based on automatic operating data which is data for moving the second character in the virtual space in accordance with a timing, the automatic operating data including position and attitude for the second character in the virtual space or player entered key input data;
determining whether the first character satisfies a predetermined condition out of a plurality of different predetermined conditions;
determine whether the second character satisfies the predetermined condition out of the plurality of predetermined conditions; and
when, based on the determinations of whether the first and second characters satisfy the predetermined condition, the second character satisfies the predetermined condition while the first character satisfies the predetermined condition, moving the second character, based on the automatic operating data, such that the second character is moved from a state in which the second character satisfies the predetermined condition.

28. An information processing system comprising:
an input device configured to output operational data indicating operational inputs entered by a player;
a display configured to display predetermined characters in a virtual space; and
a computing system, comprising at least one processor, the computing system configured to at least provide:
a first character control that moves a first character in the virtual space based on the operational data received from the input device;
a second character control that moves a second character independently of the first character in the virtual space based on automatic operating data which is data for moving the second character in the virtual space in accordance with a timing, the automatic operating data including position and attitude for the second character in the virtual space or player entered key input data; and
a determination that determines whether the first character satisfies a predetermined condition out of a plurality of different predetermined conditions; and a determination that determines whether the second character satisfies the predetermined condition determined to be satisfied by the first character, wherein, when, based on the determinations of whether the first and second characters satisfy the predetermined condition, the second character satisfies the predetermined condition while the first character satisfies the predetermined condition, the second character control moves the second character, based on the automatic operating data, such that the second character is moved from a state in which the second character satisfies the predetermined condition.

\* \* \* \* \*